Figure 1:
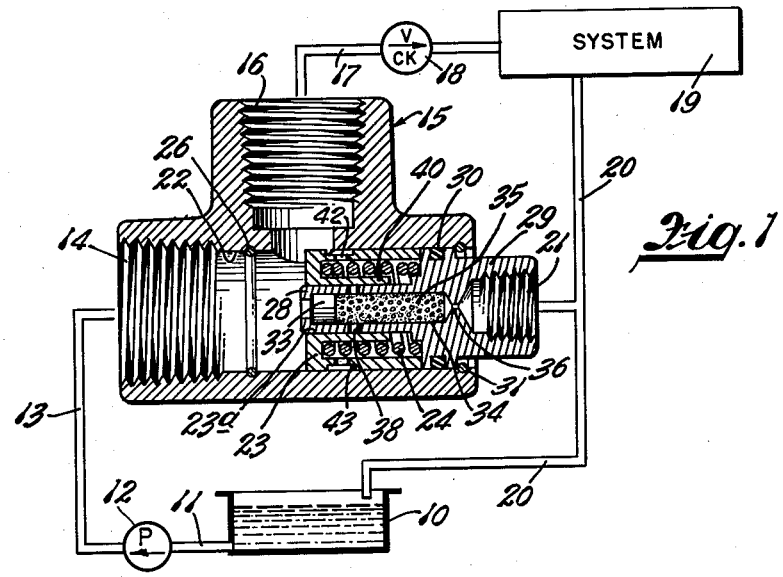

April 21, 1953     C. E. DEARDORFF     2,635,620
AUTOMATIC AIR BLEED VALVE
Filed Feb. 7, 1951

INVENTOR
C. E. Deardorff
BY
ATTORNEY

Patented Apr. 21, 1953

2,635,620

UNITED STATES PATENT OFFICE 2,635,620

AUTOMATIC AIR BLEED VALVE

Clinton E. Deardorff, San Fernando, Calif., assignor to Bendix Aviation Corporation, South Bend, Ind., a corporation of Delaware Application February 7, 1951, Serial No. 209,849

7 Claims. (Cl. 137—197)

This invention relates to automatic air bleed valves for use in hydraulic power systems deriving pressure liquid from a pump, to eject air or other gas that may become entrained with the liquid entering the pump.

An object of the invention is to provide a simple, inexpensive and reliable air bleed valve of this type.

Other more specific objects and features of the invention will become apparent from the description to follow.

Many hydraulic pumps are incapable of pumping air or other gas against high pressure. Hence, if air accidentally gets into the inlet line of the pump, the pump cannot discharge it and may churn indefinitely unless the pressure in the pump discharge line drops to a low enough value to permit the pump to pass the air on through. Automatic air bleed valves of the type to which this invention relates are placed in series in the discharge line between the pump and the system to be supplied with pressure liquid thereby, and function to provide a low pressure path from the pump discharge line back to the liquid reservoir in response to cessation of liquid flow from the pump. This permits the pump to purge itself of the air and restore the flow of liquid, whereupon the valve closes the low pressure path back to the reservoir and permits renewed flow of liquid to the system. A check valve in the line between the air bleed valve and the system prevents loss of pressure liquid from the system while the bleed valve is functioning to clear the air from the pump.

Figure 2:
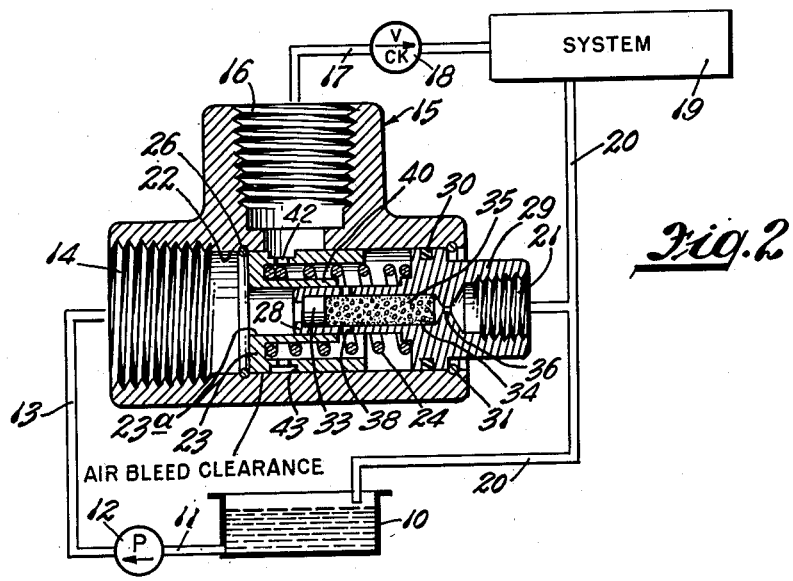

An understanding of the construction and operation of the particular air bleed valve of the present invention can be had from the following detailed description with reference to the drawing, in which:

Fig. 1 is a schematic diagram of a hydraulic system incorporating a valve in accordance with the invention, the valve being shown in longitudinal section and in open position; and Fig. 2 is a view similar to Fig. 1, but showing the valve in closed position.

Referring to Fig. 1, the system therein disclosed comprises a reservoir 10, containing a supply of liquid at low pressure, which is connected by a duct 11 to the inlet side of a pump 12, the outlet side of which is connected by a duct 13 to an inlet port 14 of an air bleed valve 15 in accordance with the invention. The outlet port 16 of the valve 15 is connected by a duct 17 containing a check valve 18 to a hydraulic system 19 which is to be supplied with pressure liquid. An exhaust line 20 extends from the system 19 back to the reservoir 10, and this exhaust line 20 is also connected to an air bleed port 21 of the valve 15.

The valve 15 consists of a body defining a cylinder 22 in which a main valve piston 23 is adapted to reciprocate. This piston 23 is urged to the left by a helical compression spring 24 and is adapted to be moved to the right, against the force of the spring 24, by pressure fluid in the left end of the cylinder 22, which communicates directly with the inlet port 14. It will be observed that the outlet port 16 communicates with the side of the cylinder 22 so that communication between the inlet port 14 and the outlet port 16 is established when the valve piston 23 is in open position, as shown in Fig. 1.

Leftward movement of the piston 23 may be limited by a split ring 26 mounted in an annular groove in the cylinder wall 22.

The piston 23 is annular in shape, having an inner cylindrical surface 23a which seals with an outer cylindrical surface of a tubular member 28 which is formed integrally with and projects from an end closure plug 29, which closes the right end of the cylinder 22. This end closure plug 29 may be sealed with the cylinder by a conventional sealing ring 30 and may be retained in position by a split ring 31 positioned in an annular groove in the cylinder wall. The left end of the tubular member 28 is closed by a plug 33 to define a chamber 34 which may contain a porous filter element 35. The right end of the chamber 34 communicates through a restricted passage 36 with the bleed port 21. Near its left end, the chamber 34 is communicated by a pair of ports 38 in the tubular member 28 with the exterior surface thereof. Ordinarily these ports 38 are covered by an inner wall 40 of the main piston 23, but when the latter piston is in its leftmost position as shown in Fig. 2, the ports 38 are uncovered.

The system functions as follows: During normal operation, when the pump 12 is pumping liquid, this liquid is delivered through the duct 13 into the port 14 of the valve 15 and its pressure against the left end of the valve piston 23 overcomes the force of the spring 24 and moves the piston to the right, to open a passage to the outlet port 16 so that the liquid flows on through that port and through the duct 17 and the check valve 18 to the system 19. After being utilized in the system 19, the liquid at low pressure is exhausted through the duct 20 back to the reservoir 10.

The outer wall of the piston 23 contains radial ports 42 which communicate with an annular groove 43 in the outer surface of the piston, which groove is in communication with the port 16 in all positions of the piston. Hence the pressure existent in the outlet port 16 is always applied through the ports 42 to the right end of the piston 23. It will be seen therefore that it is the differential pressure between the ports 14 and 16 that acts against the valve piston 23 to move it into and hold it in open position against the force of spring 24. The latter spring is preferably relatively light.

Now let it be assumed that, as a result of a temporary depletion of the liquid supply in the reservoir 10, air enters the inlet pipe 11 to the pump 12, and that the latter is of a type unable to deliver air against high pressure, so that it ceases to deliver liquid to the line 13 and simply churns without pumping. As soon as liquid flow from the port 14 to the port 16 of valve 15 ceases, there is no longer any differential pressure to maintain the piston 23 in rightmost position, and it is restored by its spring 24 to its closed position, as shown in Fig. 2. It will be observed that in this position the ports 38 in the inner tubular member are uncovered by the inner wall of the piston 23, so that the outlet port 16 is communicated through the ports 42, the ports 38, and the restricted orifice 36 with the bleed port 21, which is connected to the exhaust duct 20. Since the check valve 18 prevents any return flow of pressure liquid from the system 19 back to the port 16 of this valve 15, the pressure in port 16 drops to a very low value.

Since there is no sealing ring on the left end of the main piston 23, it does not form a perfect seal with the cylinder wall 22, and hence there is leakage from the inlet port 14 past the periphery of the piston into the annular groove 43 and thence to the exhaust line 20 through the path previously traced. Hence the pressure originally existent in the outlet duct 13 of the pump 12 at the time the pump stopped pumping is quickly dissipated through the clearance space around the left end of the piston 23. When this pressure in the outlet duct 13 of the pump 12 has dropped to a relatively low value, the pump 12 is able to deliver the air with which it is bound into the duct 13, and it continues to deliver the air into the duct until the liquid supply in the pump inlet duct 11 is restored. This air that is delivered into the duct 13 passes on through the inlet port 14 of the valve 15, past the clearance around the left end of the piston 23 and through the ports 42, ports 38 and the filter element 35, and the restricted passage 36 into the exhaust duct 20 where it finds its way back to the reservoir 10 and separates from the fluid therein by gravity.

As soon as the air has been cleared from the pump in the manner described, the latter again pumps liquid at full pressure and the differential pressure created by the liquid flow between the inlet and outlet ports 14 and 16 respectively of the valve 15, moves the piston 23 back into the open position shown in Fig. 1.

The resistance to flow through the bleed circuit including the clearance around piston 23, ports 42, ports 38, and orifice 36 should not be too low, else the piston 23 will not open promptly when the air has been cleared. On the other hand, if the resistance is too high, excessive time will be required to clear the air.

This resistance is primarily a function of the clearance around piston 23, which produces the pressure drop for moving the piston into open position, and secondarily a function of the size of the orifice 36. If the clearance around piston 23 is carefully controlled, the orifice 36 can be eliminated, and this is the ideal condition, since substantially the entire pressure drop through the bleed circuit is then effective to move the piston 23. In practice, however, it is expensive to fit the piston 23 in the cylinder 22 with such accuracy as to give the exact clearance desired. It is more practicable to make this clearance larger than its optimum value, and prevent excessive loss of liquid through the bleed circuit by providing the orifice 36. In practice, the resistance to flow of liquid through the clearance around piston 23 should be of the same order of magnitude as that through the orifice 36, to insure sufficient pressure drop across the piston to open it in response to liquid flow.

Although for the purpose of explaining the invention, a particular embodiment thereof has been shown and described, obvious modifications will occur to a person skilled in the art, and I do not desire to be limited to the exact details shown and described.

I claim:

1. An air-bleed valve having: an inlet port; an outlet port; and a bleed port; means defining a bleed passage between said outlet and bleed ports; first normally closed valve means between said inlet and outlet ports responsive to differential pressure therebetween for opening in response to pressure in said inlet port exceeding pressure in said outlet port by a predetermined value; second normally open valve means between said outlet port and said bleed port; means responsive to opening of said first valve for closing said second valve; and means defining a restricted passage between said inlet and outlet ports when said first valve is closed.

2. A valve according to claim 1 in which said bleed passage contains a restriction offering resistance to fluid flow of the same order of magnitude as that of said restricted passage between said inlet and outlet ports when said first valve is closed.

3. A valve according to claim 2 in which said restriction in said bleed passage is constituted by a single small orifice, and filter means in said bleed passage between said outlet port and said orifice.

4. A valve according to claim 1 in which said first valve means comprises a cylinder connected at one end to said inlet port, and connected intermediate its ends to said outlet port; a piston in sliding relation in said cylinder between a closed position toward said one end in which it covers said outlet port and an open position more remote from said one end in which it uncovers said outlet port, and spring means urging said piston toward said one end in opposition to pressure in said one end, the contacting surfaces of said piston and cylinder constituting said means defining a restricted passage between said inlet and outlet ports and having clearance space therebetween constituting said restricted passage.

5. A valve according to claim 1 in which said second valve means comprises a pair of telescoping tubular members in fluid-sealing relation, one of which has a bleed port constituting a portion of said bleed passage, and adapted to be covered and uncovered by telescoping movement of said members, said means responsive to opening of said first valve for closing said second valve comprising means connecting one of said telescoping members to the valve body, and the other to said first valve in such relation that opening movement of said first valve closes said bleed port, and closing movement of said first valve opens said bleed port.

6. An air bleed valve comprising a valve body having a pressure inlet port, a pressure outlet port, and an air discharge port; said body defining a cylinder connected at one end to said inlet port, and connected intermediate its ends to said outlet port; a piston in said cylinder for movement between a closed position toward said one end in which it covers said outlet port and an open position more remote from said one end in which it uncovers said outlet port; and spring means urging said piston toward said one end in opposition to pressure in said one end; means defining a bleed passage between said outlet port and said air discharge port, and means for blocking said bleed passage in response to movement of said piston into open position, said piston having leakage clearance with said cylinder at a portion of its periphery between said inlet and outlet ports when the piston is in its said closed position.

7. An air bleed valve comprising a valve body having a pressure inlet port, a pressure outlet port, and an air discharge port, said body defining a main passage interconnecting said inlet and outlet ports; a main valve member in said body movable between a closed position in which it greatly reduces but does not block fluid flow through said main passage, and an open position in which it permits substantially free flow therethrough, opening movement of said valve member being in the direction of fluid flow from said inlet to said outlet, and means acting in opposition to the fluid flow into said inlet port for urging said valve toward closed position; means defining a bleed passage between said outlet port and said air discharge port, and means for blocking said bleed passage in response to movement of said valve member into open position.

CLINTON E. DEARDORFF.

References Cited in the file of this patent

UNITED STATES PATENTS

| Number | Name | Date |
|---|---|---|
| 217,838 | Westinghouse | July 22, 1879 |
| 2,469,362 | Bashark | May 10, 1949 |